UNITED STATES PATENT OFFICE 2,586,238

COPOLYMERS OF ACRYLONITRILE AND AMINE OXIDES

Marion R. Lytton, West Chester, Pa., assignor, by mesne assignments, to The Chemstrand Corporation, Philadelphia, Pa., a corporation of Delaware No Drawing. Application June 30, 1950, Serial No. 171,558

5 Claims. (Cl. 260—85.5)

This invention relates to a new class of inherently dye-receptive polymeric materials, compositions, and shaped articles comprising the polymers, and to methods for producing them.

The new polymeric materials are copolymers of acrylonitrile with tertiary amine oxides having the following general formulae, in which the oxygen is shown attached to the nitrogen by a semi-polar bond:

$$R_1R_2R_3N \rightarrow O$$

and $$XR_3N \rightarrow O$$

and wherein $R_1$ and $R_2$ each represents a monovalent alkyl radical, e. g., a methyl, ethyl, propyl or butyl radical, an aryl radical, e. g., a phenyl, naphthyl, tolyl or xylyl radical, or an aralkyl radical, e. g., a benzyl or ethylphenyl radical, and $R_1$ and $R_2$ may be the same or different, and X together with the nitrogen of the formula represents a divalent radical derived from a heterocyclic secondary amine, and $R_3$ is a group selected from

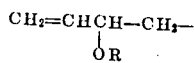

and

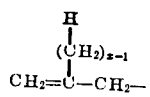

wherein R is selected from hydrogen and acyl radicals having from 1 to 12 carbons, and $x$ is an integer from 1 to 3.

The oxides which are copolymerized with acrylonitrile in accordance with the invention may be obtained by treating the corresponding amine, in aqueous solution, with a suitable oxidizing agent, such as hydrogen peroxide, potassium persulfate, percarbonates, acyl peroxides, aryl peroxides, etc., in which case the oxides occur in the hydrated condition. For the purpose of the present invention, it is immaterial whether the amine oxide to be copolymerized with acrylonitrile is in the anhydrous condition resulting from isolation thereof from the aqueous medium in which the amine is oxidized, followed by drying of the amine oxide, or in the hydrated condition. When the amine oxides are used in the form of their aqueous solutions they are wholly or largely in the hydrated condition. Accordingly, the term "tertiary amine oxide," in addition to referring to the anhydrous oxides is also generically intended to include any hydrated products which will form or exist in the presence of water or moisture.

The amine oxides copolymerized with acrylonitrile in accordance with the invention may be obtained by oxidizing butene-1 derivatives of the formulae

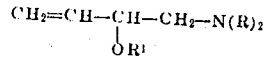

and

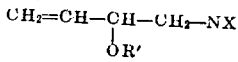

wherein R is a monovalent alkyl, aryl or aralkyl radical and X together with the nitrogen of the formula represents a divalent radical derived from a heterocyclic secondary amine, and $R^1$ is hydrogen or an acyl radical containing from one to 12 carbons. Methods for the production of these butene-1 derivatives by the reaction of butadiene monoxide with a secondary amine are described in my pending application Serial No. 149,437, filed March 13, 1950, which also discloses the production of the acyl esters of the butene-1 derivatives. Examples of such amines are 3-hydroxy-4-dimethylamino-butene-1, 3-hydroxy-4-morpholino-butene-1, 3-hydroxy-4-di-n-butyl-amino-butene-1, 3-hydroxy-4-piperidino-butene-1, 3-acetyl-4-dimethylamino-butene - 1, 3 - hydroxy-4-diethylamino-butene-1, etc.

Other amines which may be oxidized to produce amine oxides for copolymerization with acrylonitrile to produce the new inherently dye-receptive copolymers of the invention are those of the formulae

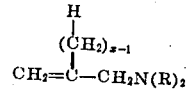

and

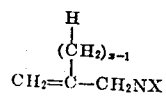

wherein $x$ is an integer from 1 to 3 and R is an alkyl, aryl, or aralkyl radical and X with the nitrogen of the formula represents a divalent radical derived from a heterocyclic secondary amine. Examples of these amines, which may be produced by methods known in the art, are N,N - dimethylallylamine, N,N - dimethyl-methallylamine, N,N - diethylallylamine, N,N - dimethyl - ethallylamine, N,N-dipropylallylamine, N,N - dibutylallylamine, N - allylpiperidine, N - allylmorpholine, etc.

The new copolymers may be synthesized from mixtures of acrylonitrile and the amine oxide in any desired proportions from 99–1 of one to 1–99 percent by weight of the other by any of the known polymerization procedures including mass or bulk polymerization when the amine oxide is used in the anhydrous condition, and polymerization in aqueous suspension or emulsion in the presence of a dispersing or emulsifying agent when the amine oxide is used in either the anhydrous condition or in the form of an aqueous solution, the suspension or emulsion being maintained by any agitation method, for example by tumbling in a rotating reactor, or through the use of any suitable rotary stirring device. A wide variety of emulsifying agents may be used. In general, any composition having both hydrophilic and hydrophobic radicals may be used and the expression "emulsifying agent" is intended to include commercial soaps made by the saponification of animal and vegetable oils, such as sodium stearate, potassium laurate, ammonium oleate, and mixtures of these and other salts as they occur in commercially available soaps. Other emulsifying agents are the rosin soaps, the salts of sulfonated hydrocarbons, disoaps, the sodium sulfosuccinates, the salts of partial alkyl esters of sulfuric acid and high molecular weight alcohols, quaternary ammonium salts such as stearyl dimethyl benzyl ammonium chloride, non-ionic emulsifiers such as ethylene oxide condensates of hexitan monostearates, fatty acids, mercaptans and alcohols, and hexitan monostearates.

The copolymerization reaction may be catalyzed by means of any free-radical-producing catalyst. Suitable catalysts include the water-soluble peroxy compounds for example hydrogen peroxide, sodium peroxide, sodium perborate, sodium persulfate and other alkali metal salts of peroxy acids, or other water-soluble peroxy compounds. Azo catalysts, such as azo-2,2'-diisobutyronitrile also may be used advantageously in the copolymerization. A wide variation in concentration of catalyst may be used depending on the temperature of copolymerization, the concentration of monomers in the reaction mass, and the molecular weight desired for the copolymer. From 0.1 to five percent by weight of catamer may be used. In general, it is desirable to have a uniform reaction rate and therefore a substantially uniform concentration of the catalyst is desired throughout the reaction. An approximation of these conditions may be obtained by separately preparing an aqueous solution and adding the solution in increments periodically throughout the reaction.

The copolymers of the invention may also be produced by redox polymerization in which the copolymerization is conducted at low temperature in the presence of a peroxy type catalyst and a reducing agent which forms a reduction-oxidation system ("redox" system) with the peroxy compounds which accelerate the copolymerization.

The new copolymers can be produced, also, by a special solution polymerization procedure in which the solvent is saturated with a calculated mixture of the monomers, the catalyst, or a portion thereof is added, and the copolymerization is conducted just at reflux temperature in the resulting single-phase liquid system by continuously adding a mixture of the monomers in predetermined proportion to the mass at such a rate as to keep the reflux temperature substantially constant. In this manner, the desired uniform concentration of each monomer is maintained in the reactor and the products are substantially homogeneous with respect to both composition and molecular weight. The catalyst solution may be added continuously at a controlled rate to the solution to maintain the catalyst concentration constant during the reaction.

The copolymerization may be conducted in the presence of molecular weight regulators which act as chain terminators and prevent the formation of very large molecular weight increments. Such regulators are exemplified in the high molecular weight aliphatic mercaptans, such as dodecyl mercaptan and dithioglycidol, or by carbon tetrachloride.

The copolymers of the invention may contain from 1 to 99 percent, preferably from 1 to 50 percent by weight of the amine oxide in the molecule, and, depending upon their composition, are variously suitable for the production of synthetic fibers, films, and shaped articles generally, as coating compositions, and so on. In the preferred embodiment, the copolymer contains at least 80 percent of acrylonitrile, at least 1 percent of the amine oxide, and when the acrylonitrile and amine oxide total less than 100 percent of the copolymer, from 1 to 19 percent of another unsaturated monomer which is copolymerizable with acrylonitrile and the amine oxide, such as vinyl acetate, acrylic acid, esters of acrylic acid such as methyl acrylate, methacrylic acid, esters of methacrylic acid such as methylmethacrylate, styrene, methacrylonitrile, vinyl-substituted heterocyclic tertiary amines such as the various isomeric vinyl pyridines and particularly 2-vinylpyridine, the alkyl-substituted vinylpyridines such as 5-ethyl-2-vinylpyridine, the various isomeric vinylpyrazines, maleic anhydride, etc.

Those copolymers containing at least 80 percent of acrylonitrile and at least 1 percent of the amine oxide, for example copolymers of from 80 to 90 percent acrylonitrile and from 1 to 20 percent of the amine oxide and having molecular weights of from at least 10,000 to 200,000 or even higher are fiber-forming, and the fibers formed therefrom are inherently dye-receptive and can be dyed with the acid type dyestuffs without special treatments designed to condition them for dyeing. The copolymers containing less than 80 percent of acrylonitrile, for example those of from 10 to 70 percent acrylonitrile and from 30 to 90 percent of the amine oxide may be blended with fiber-forming acrylonitrile polymers containing at least 80 percent acrylonitrile and which are not dye-receptive, to produce a fiber-forming blend, and in such blends the acrylonitrile-amine oxide copolymers may be used in an amount of from 2 to 50 percent on the weight of the blend.

The new copolymers are soluble in a wide variety of solvents, depending on the composition of the copolymer. Those containing at least 80 percent acrylonitrile and at least 1 percent of the amine oxide are soluble in such solvents as N,N-dimethylformamide, N,N-dimethylacetamide, sulfolane, mixtures of nitromethane and water, mixtures of nitromethane and formamide, etc., and may be formed into valuable synthetic fibers by extruding a solution thereof in such solvents into an evaporative medium or into a liquid non-solvent for the copolymer.

The evaporative medium used in dry spinning filaments or yarns from solutions of the new copolymers may comprise any gaseous medium which is inert to the copolymer, such as air, nitrogen, steam, etc. or any mixture of such inert media.

The liquid non-solvent which is used in wet-spinning or wet-casting the solutions of the new copolymers may be a mixture of water and the spinning solvent, glycerin, isopropanol, a mixture of predominantly aromatic hydrocarbons such as that commercially available under the trade designation Solvesso-100, or any appropriate liquid which is an extractive for the spinning or casting solvent and a non-solvent for the copolymer.

Further details of the practice of the invention are set forth in the following examples in which the parts are given by weight.

*Example I*

To 34.5 parts of 10 percent aqueous hydrogen peroxide there were added 11.5 parts of 3-hydroxy-4-dimethylamino-butene-1. The mixture, which warmed spontaneously on standing, was allowed to stand for about 12 hours. Water was then removed at reduced pressure, and the concentrated residue was taken up in 100 parts of dry acetone and again concentrated at low pressure until a large crop of crystals separated. The crystalline amine oxide of 3-hydroxy-4-dimethylamino-butene-1 was quickly filtered off by suction, washed with a small amount of acetone, and stored over calcium chloride in a dessicator. M. P. 100–105° C.

To 325 parts of water there were added 5.35 parts of the amine oxide obtained as above and 30.4 parts of acrylonitrile. The solution was adjusted to a pH of 4 by the addition of dilute sulfuric acid, and heated to reflux (73° C.). A solution of 1.2 parts of potassium persulfate in 25 parts of water was added continuously over two hours, the temperature being maintained at 73° C. The copolymer was then filtered, washed, and dried. 26.5 parts of a copolymer having a specific viscosity of 0.13 at 0.1 gm. concentration in 100 ccs. of dimethylformamide was obtained.

A dimethylacetamide solution of the copolymer was cast to films by the usual methods. The film was dyed in a bath prepared by dissolving 2% of the acid dyestuff Wool Fast Scarlet G Supra, and 15 percent of 96 percent sulfuric acid in water, the percentages being based on the weight of the material being dyed. The films were dyed to a deep red shade, whereas films of polyacrylonitrile are not dyed under these conditions.

*Example II*

3-hydroxy-4-dimethylamino-butene-1 was oxidized as in Example I, but the resulting amine oxide was not crystallized from its aqueous solution.

26.0 parts of the oxide in 200 parts of water (the oxidation product) were added to 147 parts of acrylonitrile in 1600 parts of water. The pH of the combined solutions was left at 6. A solution of 5.8 parts of potassium persulfate in 100 parts of water was added continuously over a 2-hour period, the temperature being maintained at 73° C. 122 parts of the copolymer were obtained. Films of the copolymer accept the acid dyes when they are dyed by the procedure described in Example I.

*Example III*

Example I was repeated except that the copolymerization was conducted at neutral pH, i. e., the addition of the sulfuric acid of Example I was omitted. 26.0 parts of a copolymer having a specific viscosity of 0.14 at 0.1 gm. concentration in 100 ccs. of dimethylformamide was obtained. By nitrogen analysis it was found to contain 6.7 percent of the amine oxide, by weight in the molecule, the balance being acrylonitrile. The copolymer was soluble in dimethylacetamide.

Films formed from a dimethylacetamide solution of the copolymer are dyed to a deep red shade by the dyeing procedure of Example I.

*Example IV*

3-hydroxy-4-diethylaminobutene-1 was oxidized to the amine oxide under exactly the same conditions as in Example I. A portion of the crystalline amine oxide was reserved for analysis, and found to have a melting point of 70–75° C. (Analysis: Theory for $C_8H_{17}NO_2$: C, 60.3; H, 10.7; N, 8.82. Found: C, 60.44, 60.54; H, 10.78, 10.73; N, 9.03, 913.) The remainder of the oxide, in solution, was copolymerized with acrylonitrile as follows:

31.4 parts of the amine oxide in 300 parts of water were added to 153 parts of acrylonitrile in 1950 parts of water. The combined solutions were adjusted to a pH of 4 by the addition of dilute sulfuric acid, and heated to reflux (75° C.). A solution of 5.9 parts of potassium persulfate in 100 parts of water was added continuously over a period of one and three-quarter hours, the temperature being maintained at 75° C. The copolymer was then filtered, washed and dried. 115.5 parts of copolymer were obtained. By nitrogen analysis it was found to contain 7.4 percent of the amine oxide. Articles formed from a dimethylacetamide solution of copolymers of the said composition can be dyed to an acceptable shade of red as in Example I.

*Example V*

Twenty-six parts of 2-vinyl-4-butyl-morpholine were added to a mixture of 21 parts of 30 percent hydrogen peroxide and 32 parts of t-butyl alcohol. The mixture was boiled continuously under reflux for 21 hours, cooled, diluted with 200 parts of distilled water, and vacuum distilled from a hot water bath. The residue was diluted with 200 parts of distilled water, and again concentrated under vacuum.

To 1000 parts of water, there were added 13 parts of the 2-vinyl-4-butyl morpholine oxide in 100 parts of water and 87 parts of acrylonitrile containing 1 part of alpha, alpha'-azodiisobutyronitrile as catalyst. The mixture was heated for 3 hours at 73° C., after which the copolymer was removed by filtration, washed and dried. By nitrogen analysis, it was found to contain about 5 percent of 2-vinyl-4-butyl morpholine oxide.

Films formed from the copolymer were dyed to a light red shade in a dyebath and under the conditions of Example I.

*Example VI*

To 101.8 parts of 10 percent aqueous hydrogen peroxide there were added 35.5 parts of N,N-dimethylallylamine. A vigorous reaction occurred spontaneously. The solution was allowed to stand for about 12 hours, after which it was concentrated at reduced pressure. It was sublimed under high vacuum and the amine oxide was obtained in the form of white, very hygroscopic crystals having a melting point of 60–70° C. Analysis Theory: C, 59.4 percent; H, 10.9 percent; N, 13.85 percent. Found: C, 54.17, 54.23 percent; H, 10.92, 10.88 percent; N, 12.16, 12.19 percent.

To 1000 parts of water there were added 13 parts of N,N-dimethylallylamine oxide in 100 parts of water, and 87 parts of acrylonitrile containing 1 part of alpha, alpha'-diisobutyronitrile as catalyst. The mixture was heated for 3 hours at 73° C., and the copolymer was then filtered, washed, and dried. By nitrogen analysis it was found to contain about 10.8 percent of N,N-dimethylallylamine oxide.

Films formed from the copolymer were dyed as in Example I.

The invention is defined in the appended claims.

I claim:

1. A copolymer containing, by weight in the copolymer molecule, at least 80 percent of acrylonitrile and at least 1 percent of the amine oxide of 3-hydroxy-4-dimethylamino-butene-1.

2. A copolymer containing, by weight in the copolymer molecule, at least 80 percent of acrylonitrile and at least 1 percent of the amine oxide of 3-hydroxy-4-diethylaminobutene-1.

3. A copolymer containing, by weight in the copolymer molecule, at least 80 percent of acrylonitrile and at least 1 percent of 2-vinyl-4-butyl-morpholine oxide.

4. A copolymer containing, by weight in the polymer molecule, at least 80 percent of acrylonitrile and at least 1 percent of N,N-dimethylallylamine oxide.

5. A copolymer containing, by weight in the copolymer molecule, from 1 to 99 percent of acrylonitrile and from 99 to 1 percent of an amine oxide selected from the group consisting of amine oxides having the general formula $$R_1R_2R_3N \to O$$

wherein $R_1$ and $R_2$ are each selected from the group consisting of alkyl, aryl and aralkyl radicals and $R_3$ is a member selected from the group consisting of $$CH_2=CH-CH-CH_3$$
$$\qquad\qquad\;\;\;|$$
$$\qquad\qquad\;\;\;OR$$

and $$\qquad\;\;H$$
$$\qquad\;\;|$$
$$\;(CH_2)_{x-1}$$
$$\qquad\;\;|$$
$$CH_2=C-CH_2-$$

wherein R is selected from the group consisting of hydrogen and acyl radicals containing from 1 to 12 carbon atoms, and $x$ is an integer from 1 to 3; and amine oxides having the general formula $$R_3XN \to O$$

wherein $R_3$ has the same significance as above and X together with the nitrogen of the formula represents a divalent radical derived from a heterocyclic secondary amine.

MARION R. LYTTON.

REFERENCES CITED

The following references are of record in the file of this patent:

UNITED STATES PATENTS

| Number | Name | Date |
|---|---|---|
| 2,172,822 | Tamele et al. | Sept. 12, 1939 |